US012325242B2

(12) United States Patent
Tsukuda

(10) Patent No.: US 12,325,242 B2
(45) Date of Patent: Jun. 10, 2025

(54) PRINTING MATERIAL APPLYING APPARATUS

(71) Applicant: CANON KABUSHIKI KAISHA, Tokyo (JP)

(72) Inventor: Masakazu Tsukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/522,668

(22) Filed: Nov. 29, 2023

(65) Prior Publication Data

US 2024/0109329 A1 Apr. 4, 2024

Related U.S. Application Data

(63) Continuation of application No. 17/667,252, filed on Feb. 8, 2022, now Pat. No. 11,845,286.

(30) Foreign Application Priority Data

Feb. 12, 2021 (JP) ................................ 2021-021061

(51) Int. Cl.
*B41J 2/175* (2006.01)
*B41J 29/13* (2006.01)

(52) U.S. Cl.
CPC ......... *B41J 2/1752* (2013.01); *B41J 2/17506* (2013.01); *B41J 2/17509* (2013.01); *B41J 2/1754* (2013.01); *B41J 29/13* (2013.01)

(58) Field of Classification Search
CPC .... B41J 2/175; B41J 2/17506; B41J 2/17509; B41J 2/1752; B41J 2/1754; B41J 29/13
See application file for complete search history.

(56) References Cited

U.S. PATENT DOCUMENTS 10,300,703 B2 5/2019 Okumura et al.
10,308,029 B2 6/2019 Kudo et al.
(Continued)

FOREIGN PATENT DOCUMENTS

CN 206357824 U 7/2017
JP 2018-069696 A 5/2018
(Continued)

OTHER PUBLICATIONS

Extended European Search Report dated Feb. 12, 2024 in European Patent Application No. 23212303.4.
(Continued)

*Primary Examiner* — Anh T Vo
(74) *Attorney, Agent, or Firm* — Venable LLP

(57) ABSTRACT

A printing material applying apparatus includes a container configured to store a printing material to be supplied to an applying unit, a cap portion configured to be detachably attached to an inlet portion of the container and capable of closing the inlet portion, a first cover portion including a first engaging portion and configured to be capable of moving between a closing position where the cap portion is covered and an opening position where the cap portion is exposed, a second engaging portion configured to engage with the first engaging portion so as to regulate movement of the first cover portion from the closing position to the opening position, and a biasing unit which is separated from the cap portion and is configured to bias the first cover portion in an opening direction.

21 Claims, 15 Drawing Sheets

(56) References Cited

U.S. PATENT DOCUMENTS

| | | | |
|---|---|---|---|
| 10,675,874 B2 | 6/2020 | Moriyama et al. | |
| 10,870,284 B2 | 12/2020 | Osakabe et al. | |
| 11,845,286 B2 * | 12/2023 | Tsukuda | B41J 2/17509 |
| 2016/0263901 A1 | 9/2016 | Kudo et al. | |
| 2017/0266968 A1 | 9/2017 | Ishibe | |
| 2018/0311964 A1 | 11/2018 | Tanaka et al. | |

FOREIGN PATENT DOCUMENTS

| | | |
|---|---|---|
| JP | 2018-069705 A | 5/2018 |
| JP | 2018-140549 A | 9/2018 |
| JP | 2018-187779 A | 11/2018 |

OTHER PUBLICATIONS

Extended European Search Report dated Jun. 13, 2022, in European Patent Application No. 22153830.9.
Office Action dated Oct. 4, 2024, in Japanese Patent Application No. 2021-021061.
Office Action dated Nov. 8, 2024, in Korean Patent Application No. 10-2022-0017938.

* cited by examiner

PRINTING MATERIAL APPLYING APPARATUS

BACKGROUND OF THE INVENTION

Field of the Invention

The present invention relates to a printing material applying apparatus.

Description of the Related Art

As an example of a printing material applying apparatus, a printing apparatus for printing an image by discharging ink to a print medium such as paper is known. Japanese Patent Laid-Open No. 2018-69705 discloses a liquid jetting apparatus including a liquid storage portion 40 including an inlet port configured to replenish ink, a plug member 50 capable of opening/closing the inlet port, a cover 32 that covers the plug member 50, and an image reading device 13 that covers the storage device 32.

If an opening/closing member, like the cover 32 or the plug member 50 in Japanese Patent Laid-Open No. 2018-69705, is not appropriately moved to a closing position by a user, the image reading device 13 or the cover 32 may break because it cannot appropriately be closed, or liquid leakage from the liquid storage portion 40 may occur. Even if the user intends to move the opening/closing member to the closing position, the opening/closing member may not properly be positioned at the closing position. If the position deviation is small, the user cannot notice it.

SUMMARY OF THE INVENTION

The present invention provides a technique for allowing a user to easily visually know whether a member to be opened/closed is located at a closing position.

According to an aspect of the present invention, there is provided a printing material applying apparatus comprising: a container configured to store a printing material to be supplied to an applying unit configured to apply the printing material used to perform printing on a print medium; a cap portion configured to be detachably attached to an inlet portion, which is provided in the container and through which the printing material is loaded into the container, and capable of closing the inlet portion; a first cover portion including a first engaging portion and configured to be capable of moving between a closing position where the cap portion is covered and an opening position where the cap portion is exposed; a second engaging portion configured to engage with the first engaging portion so as to regulate movement of the first cover portion from the closing position to the opening position; and a biasing unit which is separated from the cap portion and is configured to bias the first cover portion in an opening direction.

Further features of the present invention will become apparent from the following description of exemplary embodiments (with reference to the attached drawings).

DESCRIPTION OF THE EMBODIMENTS

Figure 1:
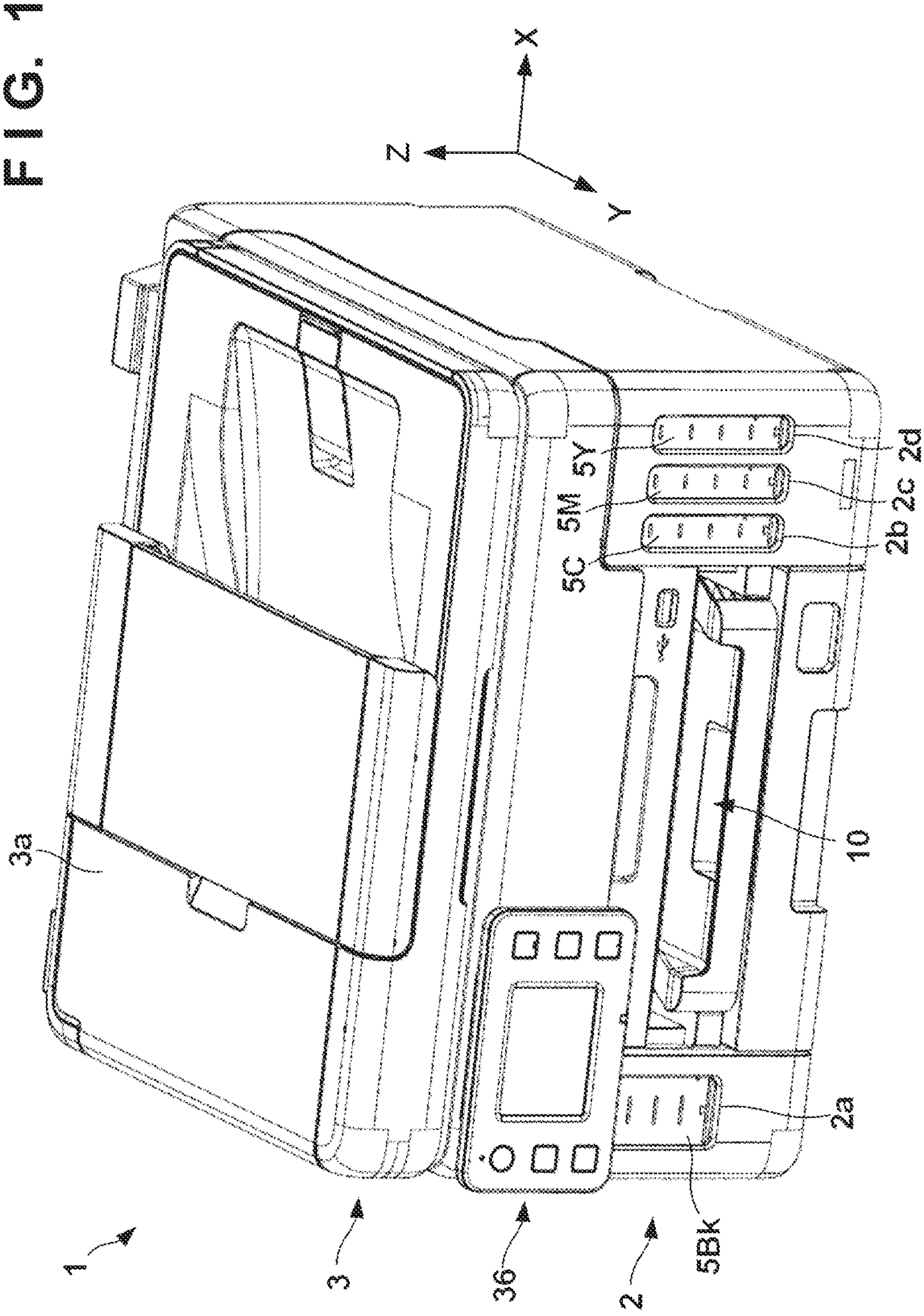
FIG. 1 is a view showing the outer appearance of a liquid discharge apparatus according to an embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted

First Embodiment

<Outline of Liquid Discharge Apparatus>

As an embodiment of a printing material applying apparatus according to the present invention, a liquid discharge apparatus will be described as an example. The liquid discharge apparatus applies a liquid serving as a printing material to a print medium. FIG. 1 is a view showing the outer appearance of a liquid discharge apparatus 1 according to an embodiment of the present invention, which is viewed from the front side. The liquid discharge apparatus 1 according to this embodiment is an inkjet printing apparatus configured to perform printing on a print medium by discharging ink as a liquid. The present invention can be applied to various kinds of liquid discharge apparatuses other than the inkjet printing apparatus. In FIG. 1, arrows X and Y indicate horizontal directions orthogonal to each other, and an arrow Z indicates a vertical direction (gravity direction). The X direction is the widthwise direction (leftand-right direction) of the liquid discharge apparatus 1. The Y direction is the depth direction of the liquid discharge apparatus 1.

Note that "print" includes not only formation of significant information such as a character or graphic pattern but also formation of an image, design, or pattern on print media in a broader sense and processing of print media regardless of whether the information is significant or insignificant or has become obvious to allow human visual perception. Also, in this embodiment, "print medium" is assumed to be sheet-shaped paper but may be a fabric, a plastic film, or the like.

The liquid discharge apparatus 1 has a flat rectangular parallelopiped shape as a whole, and includes an apparatus main body 2 and a cover portion 3. The cover portion 3 is provided to cover the apparatus main body 2, and constitutes the top part of the liquid discharge apparatus 1. The cover portion 3 according to this embodiment is provided with a reading unit (scanner unit) 3*a* that reads the image of an original. A discharge portion 10 to which a printed print medium is discharged is formed in the front portion of the liquid discharge apparatus 1. In addition, an operation unit 36 that accepts a user operation is provided in the front portion of the liquid discharge apparatus 1. The operation unit 36 includes a touch panel type display unit, and accepts an input operation of the user and displays information to the user.

A plurality of window portions 2*a* to 2*d* are formed in a housing that forms the outer wall of the apparatus main body 2. The user can visually recognize components inside the apparatus main body 2 via the window portions 2*a* to 2*d*. In this embodiment, the user can visually recognize the remaining amounts of liquids stored in containers 5Bk, 5C, 5M, and 5Y (to be referred to as a container 5 hereinafter collectively or without distinction) via the window portions 2*a* to 2*d*. The container 5 is an ink tank that store ink as a liquid, and the four containers 5 store different types of ink. In this embodiment, black ink is stored in the container 5Bk, cyan ink is stored in the container 5C, magenta ink is stored in the container 5M, and yellow ink is stored in the container 5Y Note that the types of ink are not limited to the four types, as in this embodiment. One type of ink may be used, or a plurality of types of inks other than four types may be used. The number of containers 5 need only be equal to or more than the number of types of liquid ink.

Figure 2:
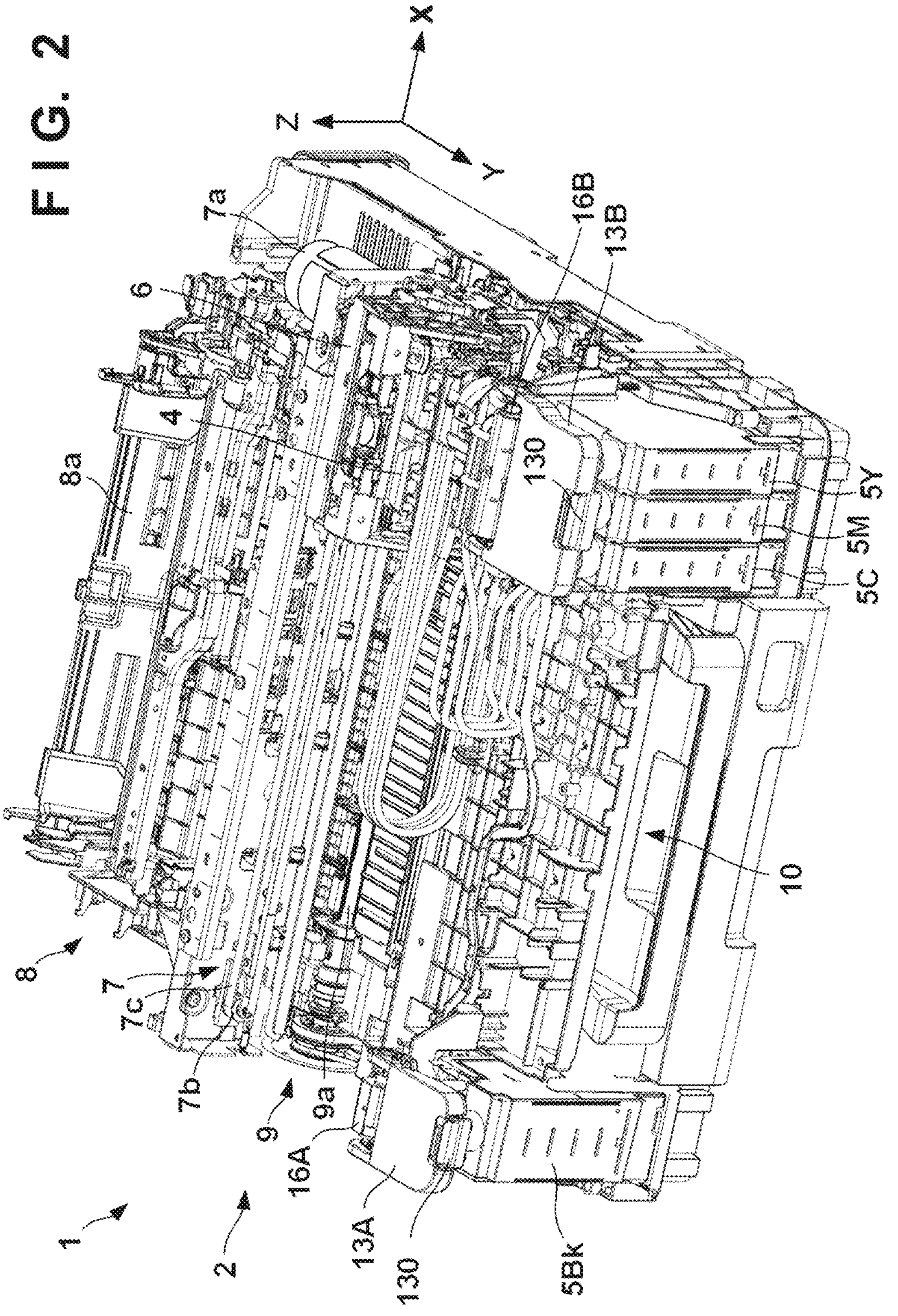
FIG. 2 is an explanatory view showing the internal mechanism of the liquid discharge apparatus shown in FIG. 1.

FIG. 2 is an explanatory view showing the internal mechanism of the liquid discharge apparatus 1. As an applying head that applies a printing material, the liquid discharge apparatus 1 includes a discharge head 4 that discharges a liquid. The discharge head 4 according to this embodiment is a printhead that performs printing by discharging ink supplied from the container 5 to a print medium. The discharge head 4 includes a discharge surface 4*a* (see FIG. 3) in which a plurality of nozzles configured to discharge ink are formed. Each nozzle is provided with, for example, an electrothermal transducer (heater). The electrothermal transducer heats and foams the ink by energization, and the ink is discharged by the foaming energy.

The discharge head 4 is mounted on a carriage 6. The carriage 6 is reciprocated in the X direction (main scanning direction) by a driving unit 7. The driving unit 7 includes a driving pulley and a driven pulley (only a driven pulley 7*b* is shown in FIG. 2) arranged apart in the X direction, an endless belt 7*c* wound around the pulleys, and a carriage motor 7*a* serving as a driving source that rotates the driving pulley. The carriage 6 is connected to the endless belt 7*c*. When the endless belt 7*c* is made to travel, the carriage 6 moves in the X direction. In the process of the movement of the carriage 6, the ink is discharged from the discharge head 4 to the print medium, thereby printing an image. This operation is sometimes called print scanning.

As described above, the liquid discharge apparatus 1 according to this embodiment is a serial type inkjet printing apparatus in which the discharge head 4 is mounted on the carriage 6 that reciprocates. However, the present invention can also be applied to another printing apparatus such as an inkjet printing apparatus including a so-called full line discharge head (printhead) provided with a plurality of nozzles configured to discharge a liquid to a region corresponding to the width of a print medium.

The liquid discharge apparatus 1 includes a feeding unit 8 and a conveying unit 9, which convey a print medium. The feeding unit 8 includes a tray 8*a* on which sheet-shaped print media are stacked, and a feeding mechanism (not shown) for the print medium. The feeding mechanism includes, for example, a feeding roller that feeds the print medium on the tray 8*a*, and a feeding motor 8*b* (FIG. 4) serving as a driving source that rotates the feeding roller.

The conveying unit 9 is a mechanism that conveys, in the Y direction (sub-scanning direction), the print medium fed from the feeding unit 8. The conveying unit 9 includes a conveying roller 9*a*, and a conveying motor 9*b* (FIG. 4) serving as a driving source that rotates the conveying roller 9*a*. A pinch roller (not shown) is pressed against the conveying roller 9*a*, and the print medium is clamped by the nip portion between these. When the conveying roller 9*a* rotates, the print medium is intermittently conveyed to the discharge head 4. The printing operation is performed by alternatively repeating the print medium conveying operation by the conveying unit 9 and print scanning.

In this embodiment, the container 5 is a stationary type container fixed in the liquid discharge apparatus 1. If the remaining ink amount decreases, the user replenishes ink in the container 5 without removing the container 5 from the liquid discharge apparatus 1.

The containers 5C, 5M, and 5Y are containers of the same structure, and the container 5Bk is a container having a larger capacity than the containers 5C, 5M, and 5Y Hence, the container 5Bk is a container having a width wider in the X direction than the containers 5C, 5M, and 5Y The container 5Bk is arranged at the left end portion of the front portion of the liquid discharge apparatus 1. The containers 5C to 5Y are arranged side by side in the X direction at the right end portion of the front portion of the liquid discharge apparatus 1. That is, these are arranged such that the discharge portion 10 is located between the container 5Bk and the containers 5C to 5Y The upper portion of the container 5Bk is covered with a cover portion 13A, and the upper portions of the containers 5C to 5Y are covered with a cover portion 13B common to these.

<Structure of Container>

Figure 3:
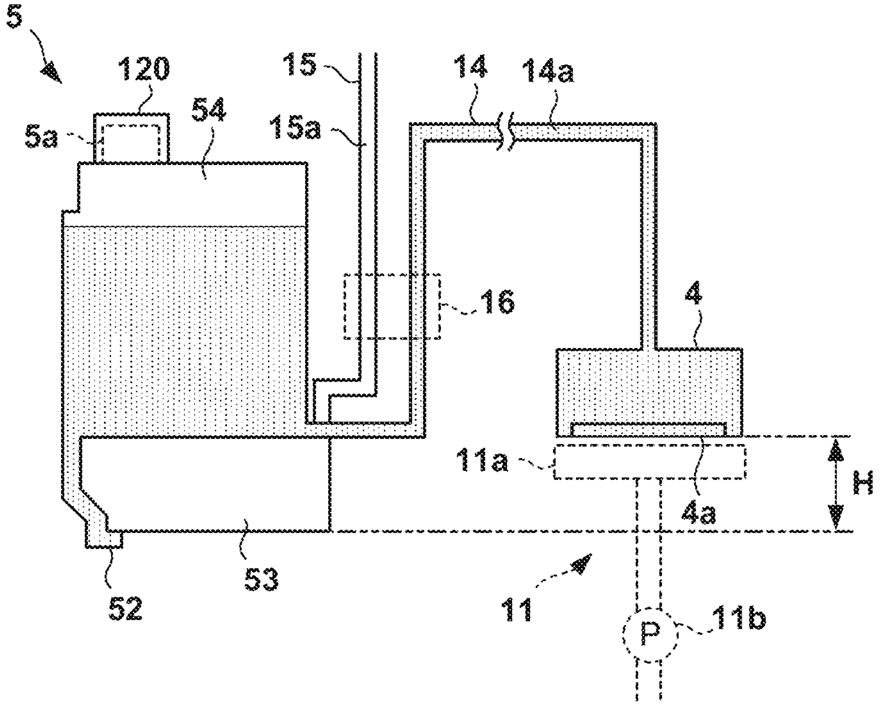
FIG. 3 is an explanatory view of a container and a configuration on the periphery.

FIG. 3 schematically shows the container 5 and a structure on the periphery. As described above, the container 5Bk and the containers 5C to 5Y basically have the structure shown in FIG. 3, although the capacities are different. The container 5 includes a storage portion 54 that stores ink, a gas-liquid exchange portion 52, and a buffer chamber 53. The gas-liquid exchange portion 52 is a portion in which the same amount of air as the ink discharged from the discharge head 4 is introduced, and the ink is normally held at the position shown in FIG. 3 by the meniscus of the ink. The buffer chamber 53 can store the ink that is pushed out as the meniscus of the ink in the gas-liquid exchange portion 52 is broken when the air in the storage portion 54 expands due to an atmospheric pressure variation, a temperature change, or the like. The upper portion of the container 5 is provided with an inlet portion 5*a* for a replenishing liquid (replenishing ink). The replenishing liquid is loaded into the container 5 through the inlet portion 5*a*. The inlet portion 5*a* is closed by a cap portion 120. The cap portion 120 is detachable from the inlet portion 5*a*, and when replenishing the ink, the user performs an ink replenishing work in a state in which the cap portion 120 is removed from the inlet portion 5*a* to open the inlet portion 5*a*. The cap portion 120 is provided for each container 5 (cap portions 120Bk, 120C, 120M, and 120Y, as will be described later).

Passages 14*a* and 15*a* communicate in the container 5. The passage 14*a* is a liquid supply path (ink supply path) communicating with the storage portion 54 and configured to supply ink from the container 5 to the discharge head 4, and is formed by a supply tube 14 that is a flexible tube. The passage 15*a* is an atmosphere communicating path communicating with the buffer chamber 53 and configured to make the inside of the container 5 communicate with the atmosphere, and is formed by an atmosphere communicating tube 15 that is a flexible tube. A valve 16 simultaneously opens/closes the passages 14*a* and 15*a*. In this embodiment, as the valve 16, a valve 16A for the container 5Bk and a valve 16B common to the containers 5C to 5Y are provided, as shown in FIG. 2. The valve 16A and the valve 16B open the passages 14*a* and 15*a* at the time of ink replenishment, and basically close these otherwise.

The gas-liquid exchange portion 52 is provided at a position lower than the discharge surface 4*a* of the discharge head 4 by a height H. That is, the gas-liquid exchange portion 52 is configured to apply a negative pressure by a water head difference corresponding to the height H to the discharge surface 4*a*. This can prevent the ink from leaking from the discharge surface 4*a*. In addition, the buffer chamber 53 is located in the lower portion of the container 5. This can prevent the ink from leaking from the atmosphere communicating path 15*a*.

A recovery unit 11 is a mechanism configured to maintain the ink discharge performance of the discharge head 4, and is arranged at one end of the moving range of the carriage 6. The recovery unit 11 includes a cap 11*a* that covers the discharge surface 4*a* of the discharge head 4, and a pump 11*b* configured to suck the ink from the discharge head 4 via the cap 11*a*. The cap 11*a* can be displaced, by a mechanism (not shown), between a position where the cap 11*a* covers the discharge surface 4*a* and a position where the cap 11*a* is separated from the discharge surface 4*a*. When the cap 11*a* covers the discharge surface 4*a* (capping), drying of the ink on the discharge surface 4*a* can be suppressed. Also, when the pump 11*b* is operated in a state in which the cap 11*a* caps the discharge surface 4*a*, it is possible to remove highly viscous ink adhered to the discharge head 4 or load the passage 14*a* or the discharge head 4 with the ink. If the printing operation is performed in a state in which the passage 14*a* or the discharge head 4 is loaded with the ink, the ink is supplied from the container 5 as much as the decrease amount (discharge amount) of ink from the discharge head 4.

<Control Unit>

Figure 4:
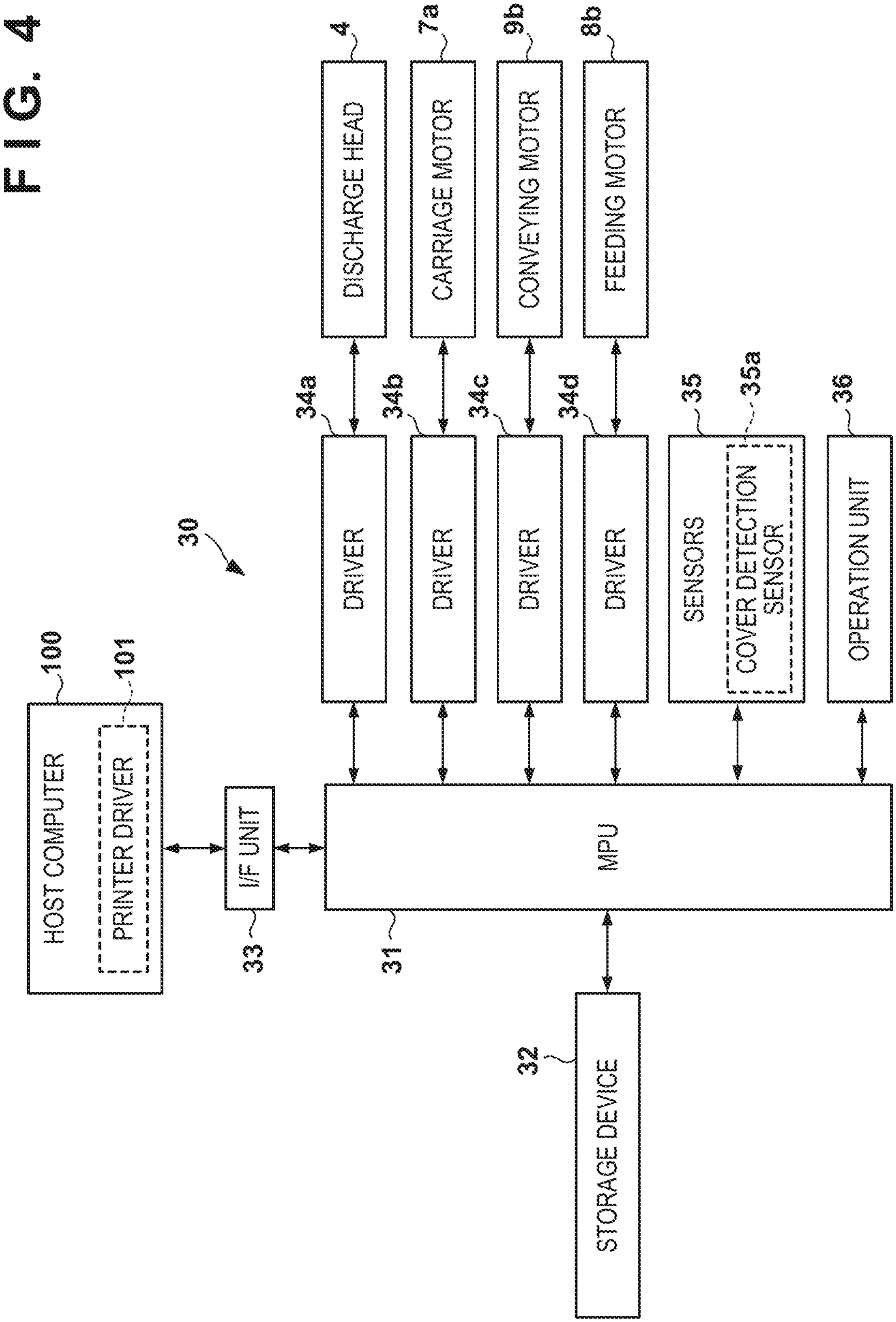
FIG. 4 is a block diagram of the control unit of the liquid discharge apparatus shown in FIG. 1.

FIG. 4 is a block diagram of a control unit 30 of the liquid discharge apparatus 1. An MPU 31 is a processor that controls each operation of the liquid discharge apparatus 1, data processing, and the like. The MPU 31 executes programs stored in a storage device 32, thereby controlling the whole liquid discharge apparatus 1. The storage device 32 is formed by, for example, a ROM or a RAM. The storage device 32 stores not only the programs to be executed by the MPU 31 but also various kinds of data necessary for processing, such as data received from a host computer 100.

The MPU 31 controls the discharge head 4 via a driver 34*a*. The MPU 31 controls the carriage motor 7*a* via a driver 34*b*. The MPU 31 also controls the conveying motor 9*b* and the feeding motor 8*b* via drivers 34*c* and 34*d*.

The MPU 31 also acquires detection results of various kinds of sensors 35 provided in the liquid discharge apparatus 1 and performs control operations. The sensors 35 include a cover detection sensor 35*a*. The cover detection sensor 35*a* detects the position of the cover portion 3. For example, the cover detection sensor 35*a* is a mechanical switch that is pressed when the cover portion 3 is located at the closing position, or a photosensor that optically detects that the cover portion 3 is located at the closing position. The MPU 31 also controls display of the display unit of the operation unit 36 and accepts a user operation on the operation unit 36.

The host computer 100 is, for example, a personal computer or a portable terminal (for example, a smartphone or a tablet terminal) used by the user. A printer driver 101 that performs communication between the host computer 100 and the liquid discharge apparatus 1 is installed in the host computer 100. The liquid discharge apparatus 1 includes an interface portion 33, and communication between the host computer 100 and the MPU 31 is executed via the interface portion 33. For example, if execution of the printing operation is input from the user to the host computer 100, the printer driver 101 collects the data of an image to be printed and settings concerning printing (information such as the quality of a printed image, and the like) and instructs the liquid discharge apparatus 1 to execute the printing operation.

<Operation Upon Liquid Replenishing>

Figure 5A:
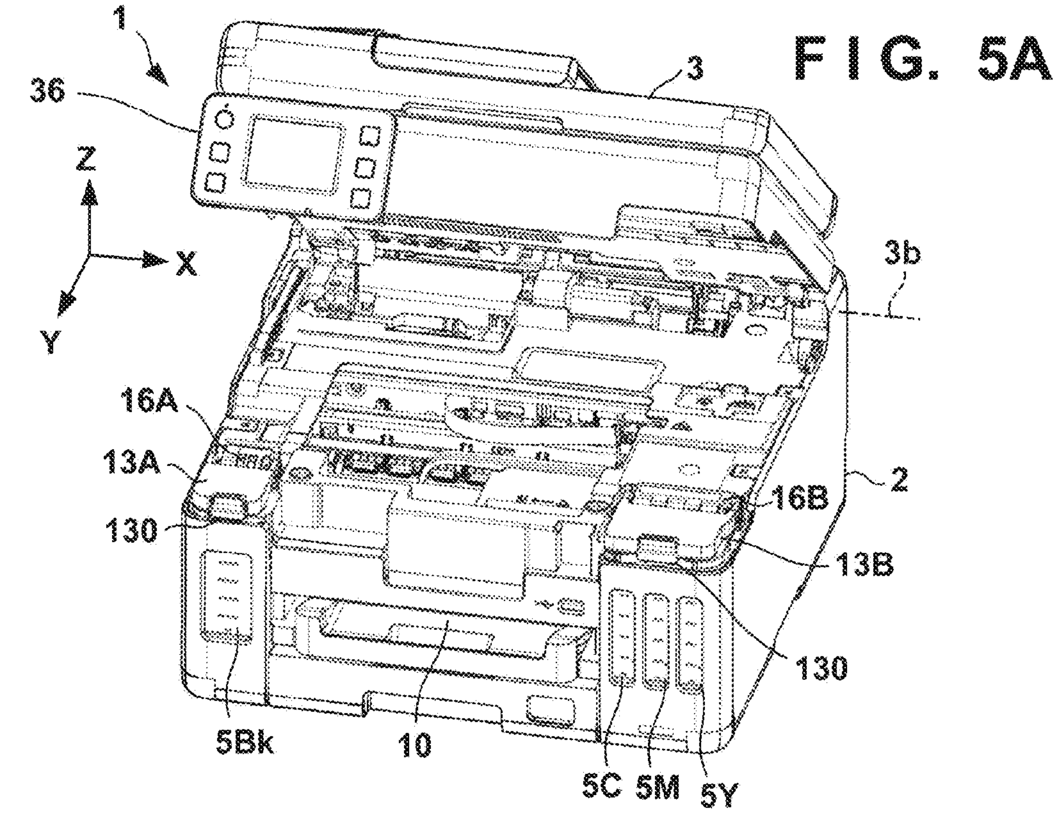
FIGS. 5A and 5B are explanatory views showing an ink replenishing procedure.

An operation procedure at the time of replenishing ink in the container 5 will be described with reference to FIGS. 5A to 6B. To replenish ink in the container 5, the inlet portion 5*a* needs to be exposed. In the liquid discharge apparatus 1 according to this embodiment, the cover portion 3 is configured to be movable, by a manual operation of the user, between a closing position (a position shown in FIG. 1) where the interior of the apparatus main body 2 is covered and an opening position where the interior of the apparatus main body 2 is exposed. FIG. 5A shows a state in which the cover portion 3 has moved to the opening position. In this embodiment, the cover portion 3 is supported by the apparatus main body 2 to be swingable between the opening position and the closing position. A swing center 3*b* of the cover portion 3 is parallel to the X direction, and is set in the rear portion of the cover portion 3 (and the apparatus main body 2). In other words, the front portion of the liquid discharge apparatus 1 is opened by the cover portion 3.

Figure 5B:
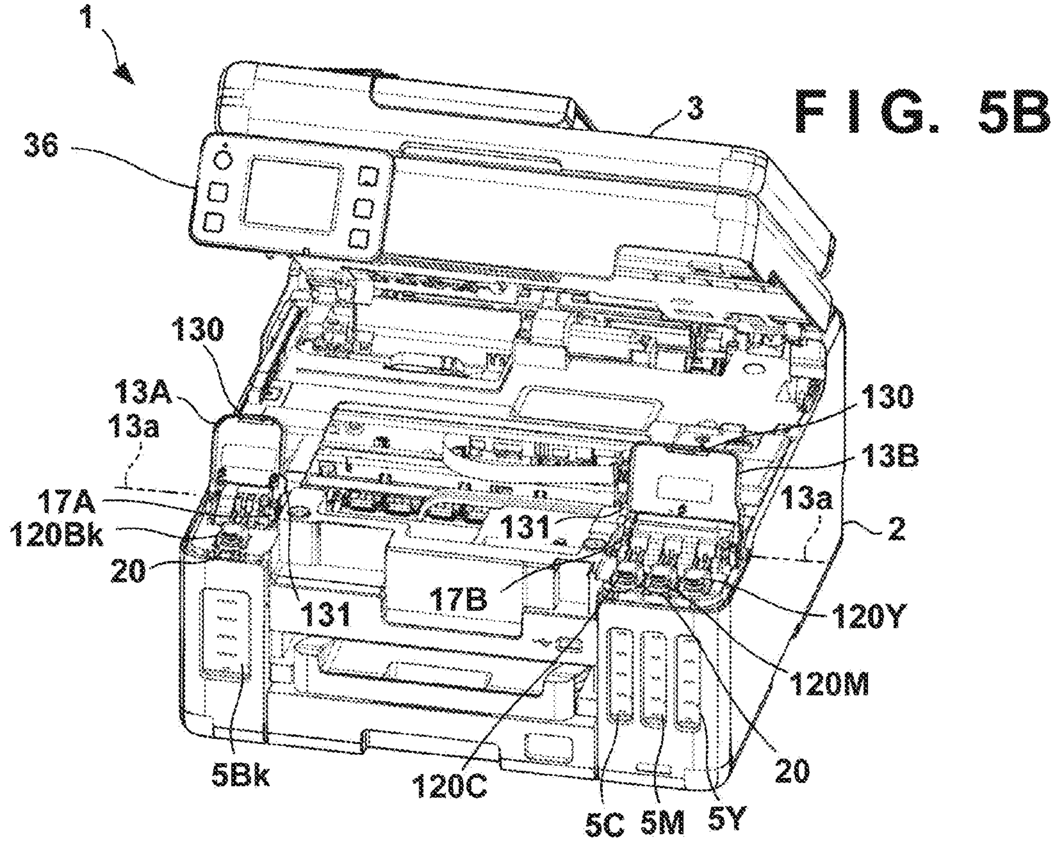

When the cover portion 3 moves to the opening position, the cover portions 13A and 13B covered with the cover portion 3 at the closing position are exposed. In the liquid discharge apparatus 1 according to this embodiment, each of the cover portions 13A and 13B is configured to be movable, by the manual operation of the user, between a closing position (a position shown in FIG. 5A) where the upper portion of the container 5 is covered and an opening position (a position shown in FIG. 5B) where the upper portion of the container 5 is exposed. FIG. 5A shows a state in which each of the cover portions 13A and 13B has moved to the closing position. In this embodiment, the cover portions 13A and 13B are supported by the apparatus main body 2 to be swingable between the opening position and the closing position. A swing center 13*a* of the cover portions 13A and 13B is parallel to the X direction, and is set in the rear portions of the cover portions 13A and 13B. The cover portion 13A covers the inlet portion 5*a* of the container 5Bk at the closing position, and exposes the inlet portion 5*a* at the opening position (normally, the inlet portion 5*a* is covered with the cap portion 120Bk, as shown in FIG. 5B). In other words, the user is allowed to access the inlet portion 5*a* in a state in which the cover portion 13A is located at the opening position. The cover portion 13B covers the inlet portions 5*a* of the containers 5C to 5Y at the closing position, and exposes the inlet portions 5*a* at the opening position (normally, each inlet portion 5*a* is covered with a corresponding one of the cap portions 120C to 120Y, as shown in FIG. 5B). In other words, the user is allowed to access the inlet portions 5*a* in a state in which the cover portion 13B is located at the opening position.

Figure 6A:
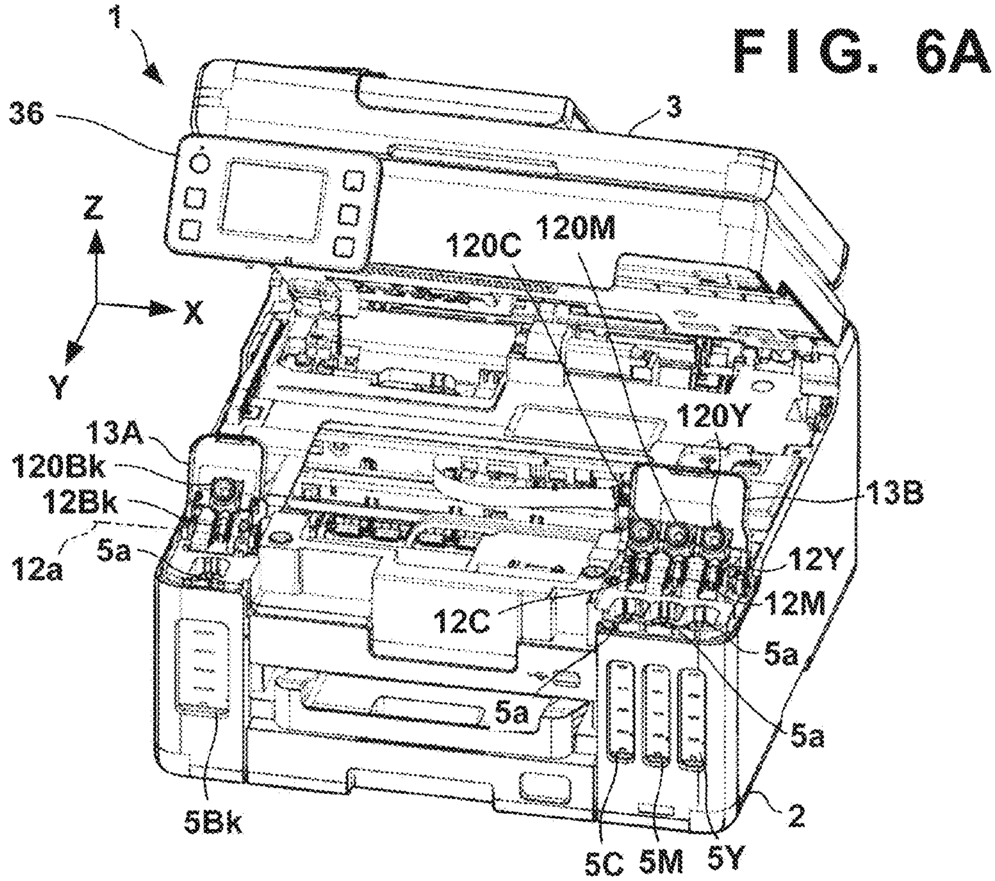
FIG. 6A is an explanatory view showing an ink replenishing procedure.
Figure 6B:
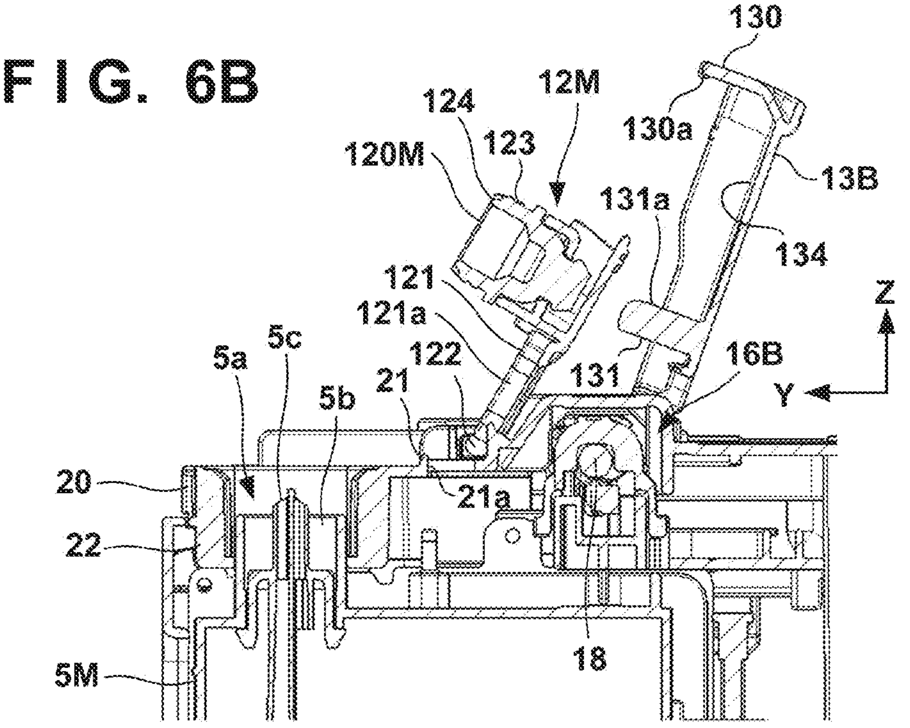
FIG. 6B is a sectional view showing the opening mode of an inlet portion.

When the cap portion 120 is removed from the container 5 as the target to replenish ink, the inlet portion 5*a* is exposed, and replenishment of ink is enabled. FIG. 6A shows a state in which the cap portions 120 of all the containers 5 are removed from the inlet portions 5*a*. FIG. 6B shows a state in which the cover portion 13B is located at the opening position, and the cap portion 120M is removed from the container 5M. The remaining containers 5Bk, 5C, and 5Y, the cover portion 13A, and the cap portions 120Bk, 120C, and 120Y are also in a similar mode. In this state, the user can replenish ink from the inlet portion 5*a* to the container 5. After the replenishment, the inlet portions 5*a* are closed by the cap portions 120, the cover portions 13A and 13B are moved to the closing position, and the cover portion 3 is also moved to the closing position. With the above-described procedure, the ink replenishing work is completed, and printing can be performed.

<Configurations of Cap Members and Cover Portions>

Figure 7A:
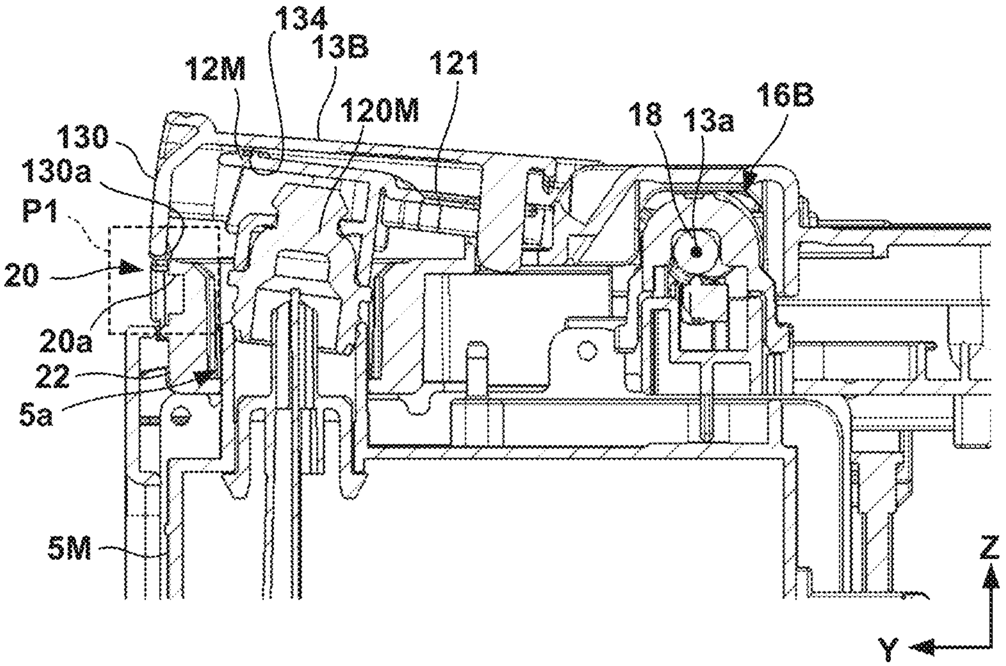
FIG. 7A is a view showing a state halfway through the movement of a cap member and a cover portion to a closing position.
Figure 7B:
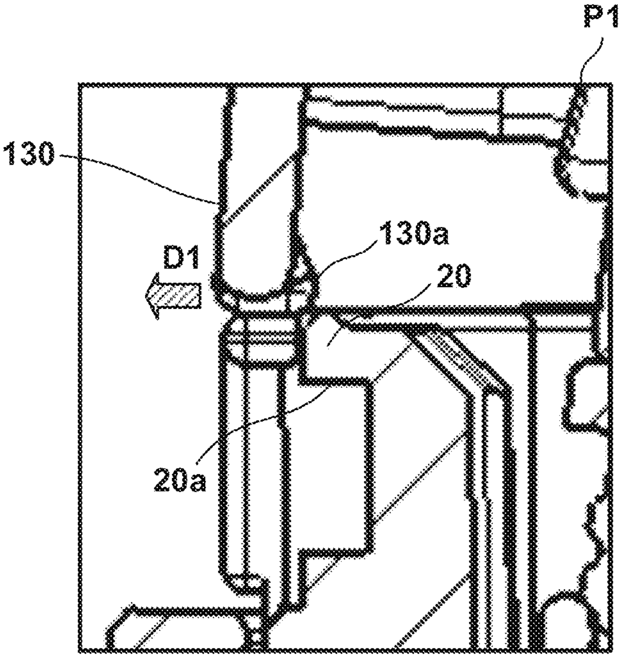
FIG. 7B is an enlarged view of a portion P1 in FIG. 7A.
Figure 8A:
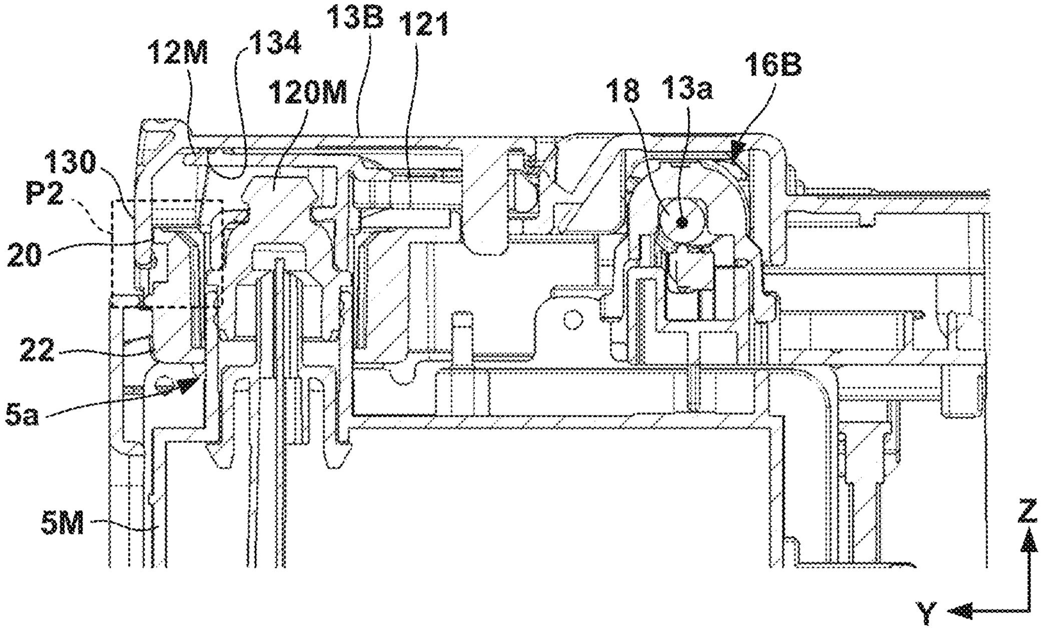
FIG. 8A is a view showing a state in which the cap member and the cover portion are moved to the closing position.
Figure 8B:
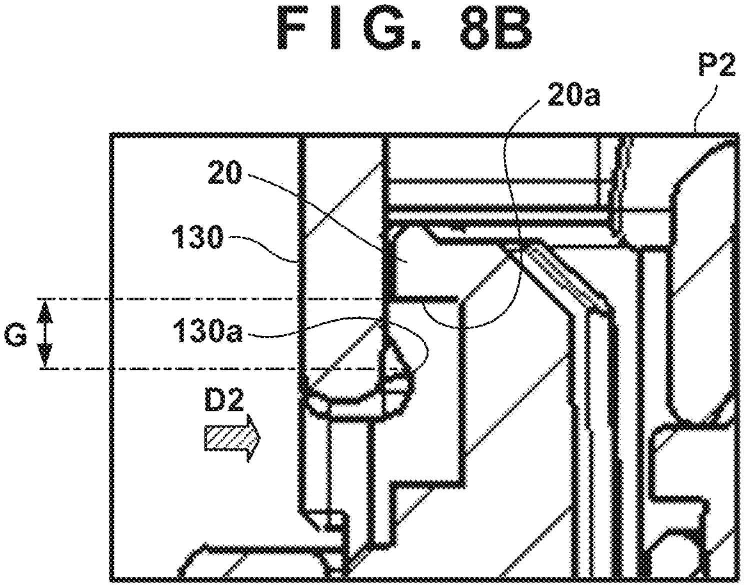
FIG. 8B is an enlarged view of a portion P2 in FIG. 8A.
Figure 9:
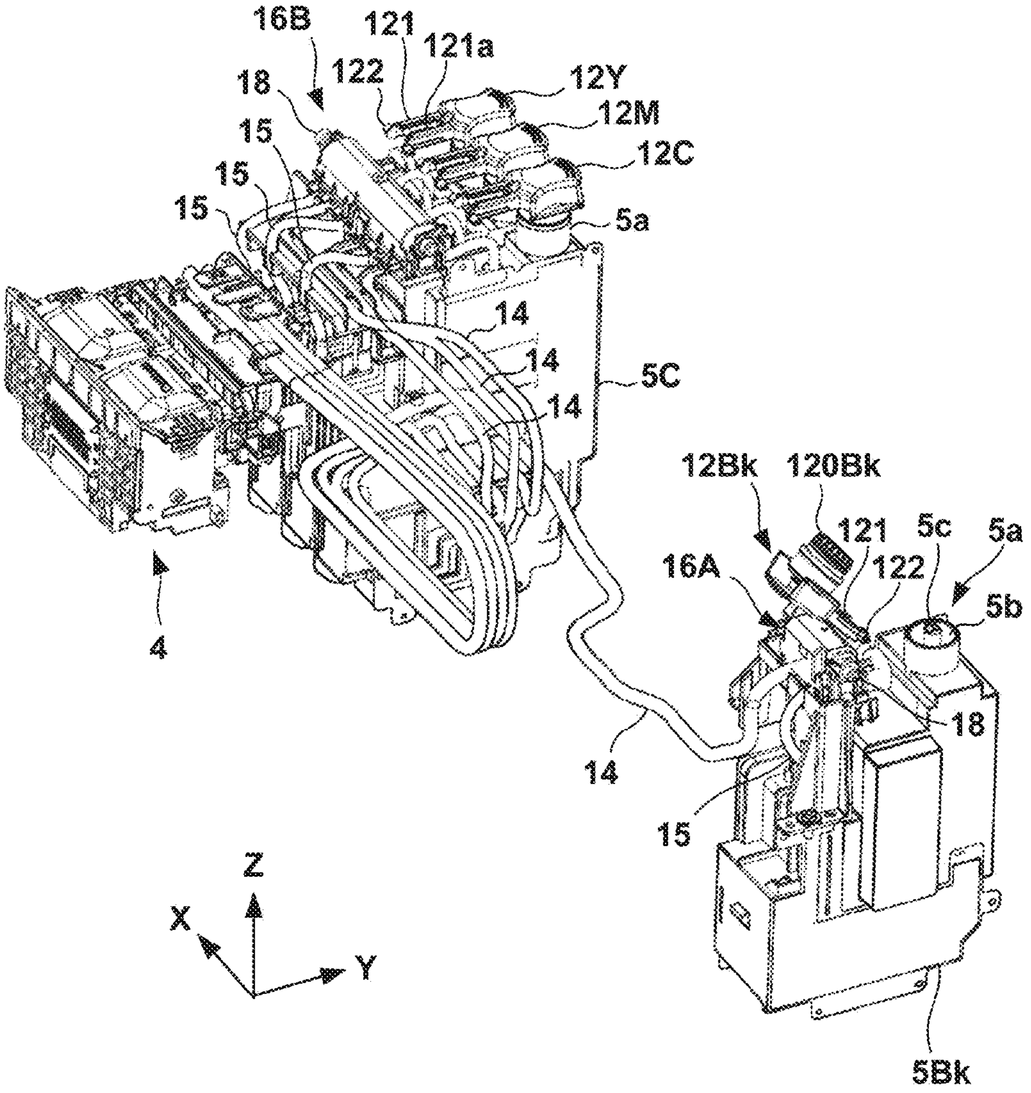
FIG. 9 is a perspective view showing the peripheral structures of the containers, valves, and a discharge head.
Figure 10:
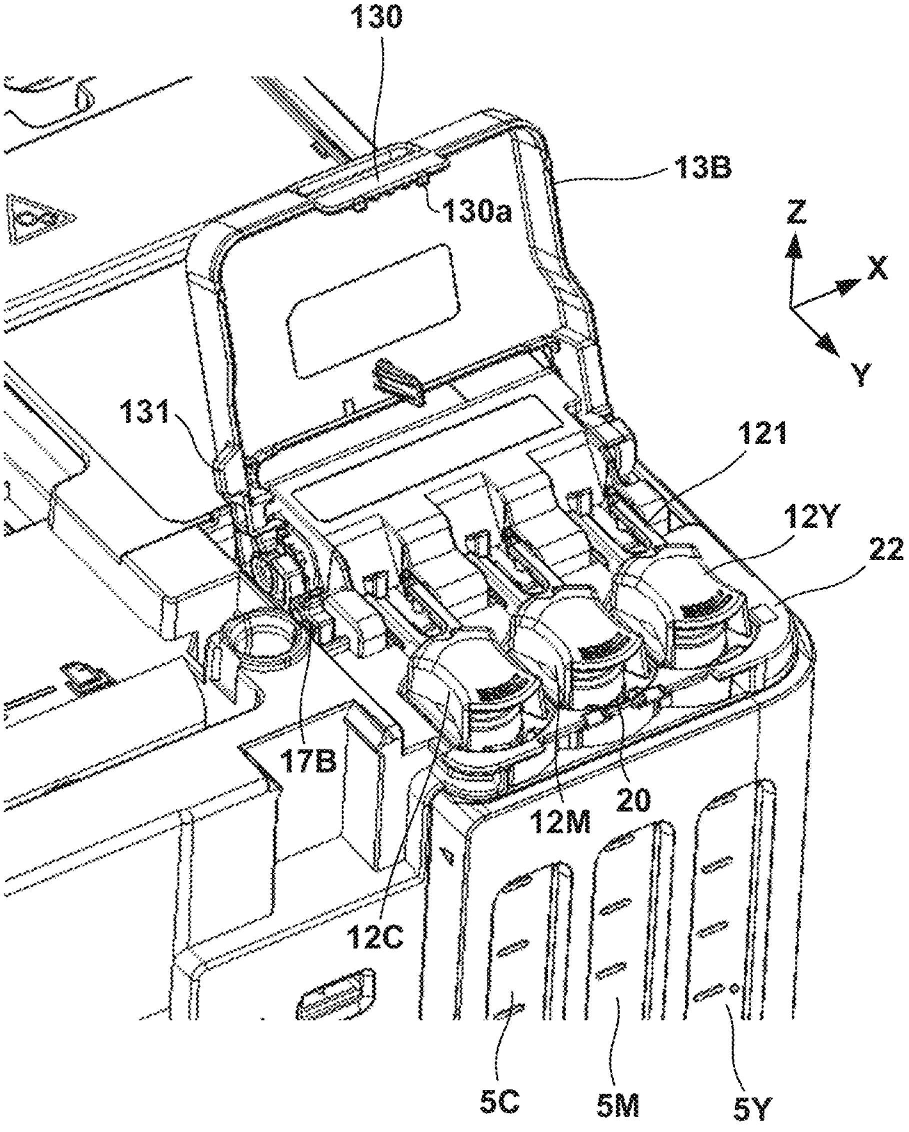
FIG. 10 is a perspective view showing the peripheral structure of the opened cover portion.

The cap portions 120Bk to 120Y are provided in cap members 12Bk to 12Y, respectively. The configuration of the cap members 12Bk to 12Y and the configuration of the cover portions 13A and 13B will be described with reference to FIGS. 6A to 9. FIG. 7A is a view showing a state halfway through the movement of the cap member 12M and the cover portion 13B to the closing position, and FIG. 7B is an enlarged view of a portion P1 in FIG. 7A. FIG. 8A is a view showing a state in which the cap member 12M and the cover portion 13B are moved to the closing position, and FIG. 8B is an enlarged view of a portion P2 in FIG. 8A. FIG. 9 is a perspective view showing the peripheral structures of the containers 5, the valves 16A and 16B, and the discharge head 4.

Note that the configurations of the cap member 12M and the cover portion 13B will mainly be described here. The cap members 12Bk, 12C, and 12Y and the cover portion 13A also have the same configurations.

The cap member 12M will be described first. The cap member 12M includes an arm portion 121. The cap portion 120M is exchangeably supported at one end portion of the arm portion 121, and a shaft portion 122 is formed at the other end portion. The arm portion 121 branches into two parts from the middle portion in the longitudinal direction toward the other end portion. The cap member 12M is supported by the apparatus main body 2 to be swingable at the shaft portion 122, and a swing center 12*a* (FIG. 6A) is parallel to the X direction.

The cap portion 120M is a cylindrical member that is open on the distal end side and closed on the base side. A seal portion 123 is formed in the middle part in the axial direction, and a distal end portion 124 defines a circular opening. The inlet portion 5*a* includes a cylindrical inlet hole 5*b*, and a tube portion 5*c* standing in the inlet hole 5*b*. An ink replenishing bottle is inserted into the inlet hole 5*b*, and ink in the bottle is loaded into the container 5M via the tube portion 5*c*.

The cap portion 120M can move between the opening position shown in FIG. 6B and the closing position shown in FIG. 8A. At the closing position, the cap portion 120M is inserted into the inlet hole 5*b* to close the inlet portion 5*a*. At the opening position, the cap portion 120M is separated from the inlet hole 5*b* to open the inlet portion 5*a*.

The user can lift the cap member 12M located at the closing position, thereby manually moving it to the opening position. Also, the user can press the cap member 12M located at the opening position, thereby manually moving it to the closing position.

In this embodiment, the cap member 12M is arranged in the swing space of the cover portion 13B, and the swing center 12*a* is located between the swing center 13*a* and the inlet portion 5*a* in the Y direction. For this reason, if the cover portion 13B is located at the closing position, the cap member 12M is covered with the cover portion 13B. Hence, the cap member 12M cannot be moved to the opening position unless the cover portion 13B is moved to the opening position. When the cap member 12M is covered with the cover portion 13B, it is possible to prevent the cap member 12M from unexpectedly moving to the opening position to open the inlet portion 5*a* and make ink leak from the inlet portion 5*a*.

The cap member 12M can move alone from the opening position to the closing position. When the cover portion 13B is moved from the opening position to the closing position, the cap member 12M can be moved from the opening position to the closing position. The inner wall surface of the cover portion 13B forms a pressing portion 134 that comes into contact with the cap member 12M in the movement from the opening position to the closing position. As shown in FIG. 7A, in the halfway stage of the movement of the cover portion 13B from the opening position to the closing position, the pressing portion 134 contacts the cap member 12M to move the cap member 12M to the closing position. When the user performs the operation of moving the cover portion 13B to the closing position after ink replenishment, the cap member 12M (and the cap members 12C and 12Y) can also move to the closing position simultaneously to close the inlet portion 5*a*. Also, this configuration can prevent the user from forgetting to move the cap member 12M to the closing position (forgetting to close the inlet portion 5*a*).

The cover portion 13B will be described next. The cover portion 13B includes an engaging portion 130 at one end portion (distal-side end portion), and a pair of bearing portions 132 at the other end portion (base-side end portion) on the opposite side. A shaft portion 18 is inserted into the bearing portions 132, and the cover portion 13B is swingably supported around the shaft portion 18. As the shaft portion 18, a shaft portion corresponding to the cover portion 13A and a shaft portion corresponding to the cover portion 13B are provided.

The engaging portion 130 engages with an engaging portion 20 on the side of the apparatus main body 2. The engaging portion 20 is formed on a frame member 22 provided on the inner side of the outer wall of the apparatus main body 2, and its position is immobile. By engaging with the engaging portion 130, the engaging portion 20 regulates the movement of the cover portion 13B from the closing position to the opening position and maintains the cover portion 13B at the closing position.

The engaging portion 130 according to this embodiment has a hook shape with a projecting portion 130*a* at the distal end portion, which projects to the side of the swing center 13*a* in the Y direction. On the other hand, the engaging portion 20 is a projecting portion projecting to the side opposite to the swing center 13*a* in the Y direction, and is formed by forming a concave portion on the lower side. When the projecting portion 130*a* comes into contact with a lower surface 20*a* of the engaging portion 20, the movement of the cover portion 13B from the closing position to the opening position is regulated. FIGS. 7A to 8B show the engaging mode between the engaging portion 130 and the engaging portion 20 when the cover portion 13B is moved from the opening position to the closing position.

When the user operates the cover portion 13B from the opening position to the closing position, the projecting portion 130*a* comes into contact with the engaging portion 20, as shown in FIGS. 7A and 7B, and the engaging portion 130 elastically deforms in the direction of an arrow D1 (in the direction opposite to the swing center 13*a* in the Y direction). When the projecting portion 130*a* gets over the engaging portion 20 downward, the engaging portion 130 elastically returns in the direction of an arrow D2 (to the side of the swing center 13*a* in the Y direction), as shown in FIGS. 8A and 8B. Hence, the engaging portion 130 and the engaging portion 20 engage with each other. When the user operates the cover portion 13B from the closing position to the opening position, the engaging portion 130 and the engaging portion 20 are disengaged by a reverse phenomenon. In this embodiment, the side of the engaging portion 130 elastically deforms, but reversely, the side of the engaging portion 20 may elastically deform. Alternatively, both may elastically deform.

When the engaging portion 130 elastically deforms from the state shown in FIG. 7B to the state shown in FIG. 8B, an appropriate click feeling can be given to the user who performs the operation. This allows the user to sense that the cover portion 13B is moved to the closing position and set in the engaging state (that each inlet portion 5*a* is closed by a corresponding one of the cap portions 120C to 120Y).

Note that in this embodiment, if the cover portion 13B is located at the opening position, the cover portion 13B is not in a vertical posture but in a standing posture while tilting backward, as shown in FIGS. 5B and 6B. This also applies to the cover portion 13A. Hence, when the user is going to move the cover portion 3 from the opening position to the closing position in this state, the cover portion 3 cannot move to the closing position because of interference with the cover portions 13A and 13B. That is, the movement of the cover portion 3 to the closing position is regulated by the opened cover portions 13A and 13B. It is therefore possible to prevent the cover portion 3 from erroneously closing during replenishment of ink.

<Biasing Unit>

Even if the user intends to move the cover portion 13A or the cover portion 13B to the closing position, if the operation is insufficient, and the cover portion is not moved to the closing position (for example, in a state shown in FIGS. 7A and 7B), inconvenience may occur. For example, the inlet portion 5*a* may not be closed by the cap portion 120, and ink leakage may occur. Alternatively, if the cover portion 3 cannot completely move the closing position, and the user performs a strong operation to force the cover portion 3 to the closing position, a break may occur. Also, if the cover detection sensor 35*a* detects that the cover portion 3 is not moved to the closing position, and a closing error is notified, the user may be unable to know the cause.

In this embodiment, the cover portion 13A and the cover portion 13B include biasing units 17A and 17B configured to bias these to the opening positions, respectively (FIG. 5B). The biasing units 17A and 17B are provided independently of the caps 12Bk to 12Y, and in a state in which the engaging portion 130 and the engaging portion 20 are disengaged, bias the cover portions 13A and 13B such that these are maintained at positions apart from the closing positions in the opening direction. The cover portion 13A and the cover portion 13B pop up, and the user can easily visually know that the cover portions are not moved to the closing positions.

The structure and functions of the biasing unit 17B will be described with reference to FIGS. 10 and 11A to 11C. Note that the biasing unit 17A has the same structure.

The biasing unit 17B is provided on the frame member 22 on a side portion of the cover portion 13B in the X direction. At this position, the biasing unit 17B hardly disturbs the operation of the user when replenishing ink. The biasing unit 17B includes a contact member 170 and an elastic member 171. The elastic member 171 is, for example, a coil spring, rubber, or the like, and biases the contact member 170 upward. The contact member 170 is inserted into an opening formed in the frame member 22 and supported to displaceable in the Z direction. A stopper 170*a* is provided at the lower end portion of the contact member 170. The stopper 170*a* regulates the upper limit position of the contact member 170. The cover portion 13B includes a contact piece 131 that comes into contact with the contact member 170. The contact piece 131 is a plate-shaped member projecting to a side of the cover portion 13B in the X direction.

Figure 11A:
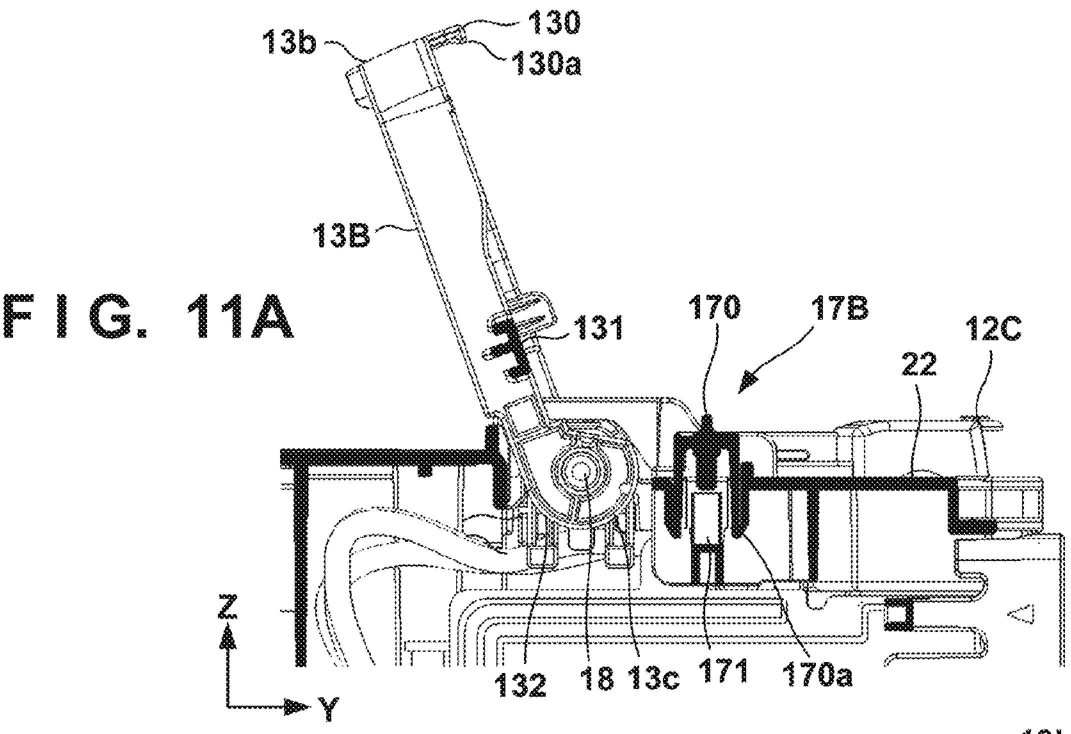
FIGS. 11A to 11C are explanatory views of the operation of a biasing unit.
Figure 11B:
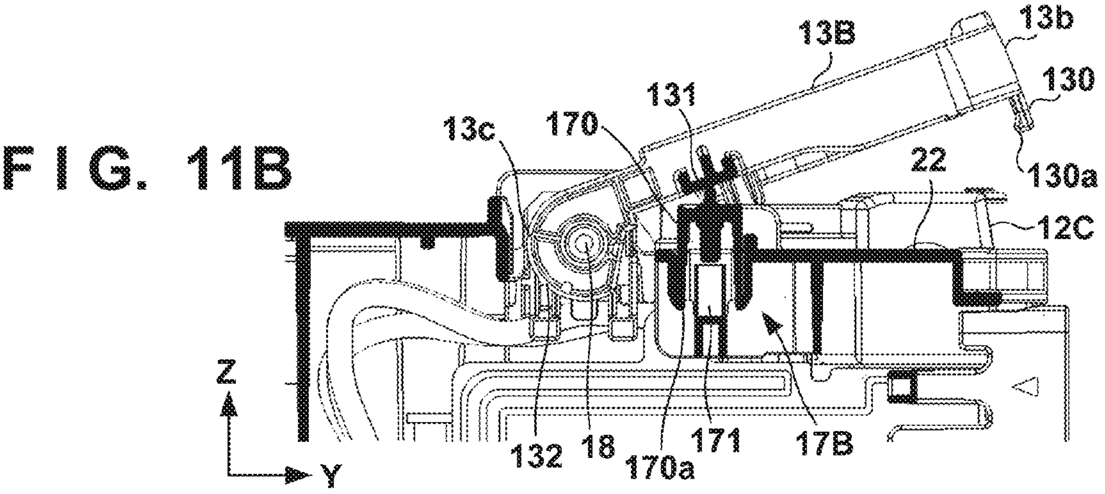
Figure 11C:
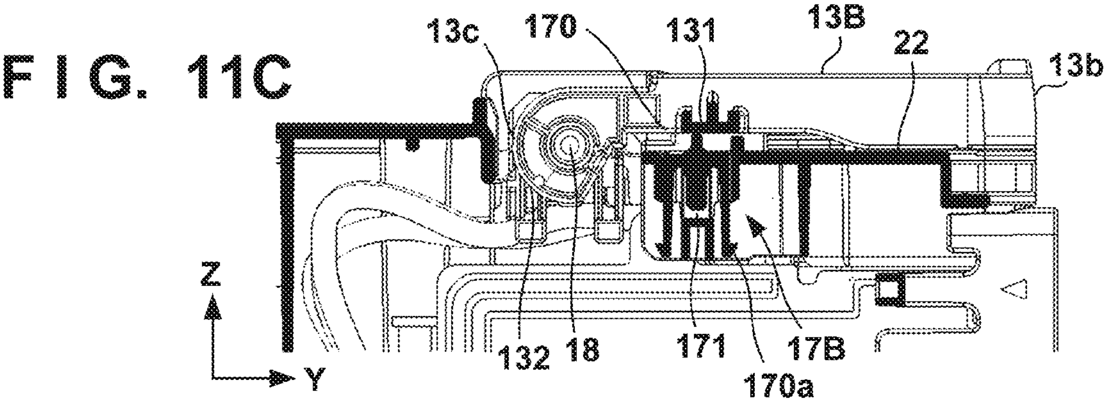

FIG. 11A shows a state in which the cover portion 13B is located at the opening position. The contact piece 131 and the contact member 170 are spaced apart, and the contact member 170 is located at the upper limit position. FIG. 11B shows a state halfway through the movement of the cover portion 13B from the opening position to the closing position. The contact piece 131 comes into contact with the contact member 170, and is biased in the opening direction by the biasing unit 17B. FIG. 11C shows a state in which the cover portion 13B further swings and reaches the closing position, and the engaging portion 130 engages with the engaging portion 20 (not shown). The contact member 170 is pressed down, and the elastic member 171 is compressed.

Assume that the user moves the cover portion 13B to the closing position, and the engagement between the engaging portion 130 and the engaging portion 20 is insufficient. In this case, when the user releases the hand, the cover portion 13B is biased by the biasing unit 17B and pops up, as shown in FIG. 11B. Hence, the user visually recognizes that the cover portion 13B is not moved to the closing position. As a result, the user moves the cover portion 13B to the closing position again and reliably engages the engaging portion 130 with the engaging portion 20. Hence, in this embodiment, it is possible to prevent forgetting of closing of the cover portion 13B and guide the user to operate the cover portion 13B to the closing position.

The position of the cover portion 13B that has popped up may be the opening position in addition to the intermediate position between the opening position and the closing position. However, in the configuration for causing the cover portion to pop up to the opening position, it is necessary to widen the biasing range of the biasing unit 17B and increase the biasing force. If the apparatus configuration is simplified, the pop-up position may be an intermediate position between the opening position and the closing position, particularly, a position within the range of 50% or a position within the range of 25% of the moving range from the closing position.

Figure 13A:
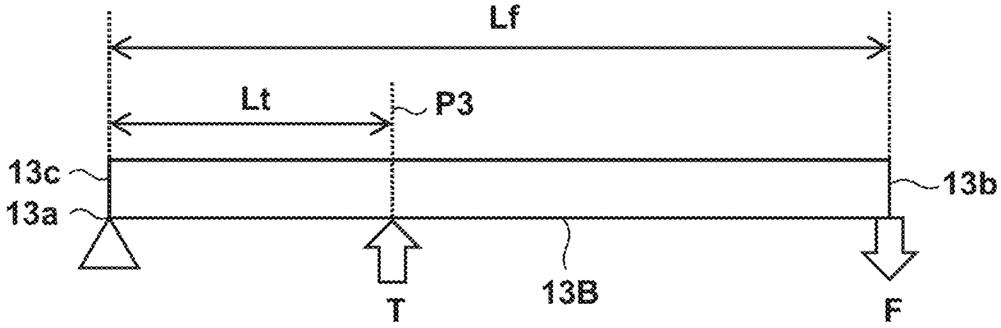
FIGS. 13A and 13B are explanatory views showing the balance relationship of forces.

FIG. 13A is a view showing the balance relationship of forces acting on the cover portion 13B. Let Lt be the distance from the swing center 13*a* of the cover portion 13B to a biasing position P3 by the biasing unit 17B, T be the biasing force of the biasing unit 17B, Lf be the distance from the swing center 13*a* to the engaging portion 130, and F be the force needed to disengage the engaging portion 130 from the engaging portion 20.

If the engaging portion 130 and the engaging portion 20 do not engage, as shown in FIG. 11B, the force F is not generated. Hence, the cover portion 13B pops up to a position where a moment by the biasing force T to the cover portion 13B and a moment by the weight of the cover portion 13B balance. Since the biasing position P3 is closer to an end portion 13*c* on the base side than an end portion 13*b* on the distal end side, the operation force of the user who operates the cover portion 13B to the closing position by pressing the end portion 13*b* on the distal end side can be made smaller. In addition, the biasing unit 17B hardly disturbs the operation of the user when replenishing ink.

To engage the engaging portion 130 with the engaging portion 20, as shown in FIG. 11C, and maintain the engagement, $Lf \times F > Lt \times T$ needs to hold. That is, a moment for engaging the engaging portion 130 with the engaging portion 20 is designed to be larger than a moment for opening the cover portion 13B by the biasing unit 17B. Since the biasing position P3 is closer to the end portion 13*c* on the base side than the end portion 13*b* on the distal end side, the engaged state is maintained even if the engaging force between the engaging portion 130 and the engaging portion 20 is relatively small.

Note that the position of the biasing position P3, the biasing force, the shapes of the cover portions 13A and 13B, the position of the contact piece 131, and the like may be common to the cover portion 13A and the cover portion 13B or different.

<Engagement Relaxation>

Figure 12A:
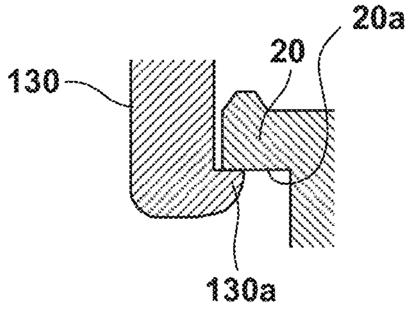
FIG. 12A is a sectional view showing an engaging mode.

In the state shown in FIG. 11C, in which the cover portion 13B is located at the closing position, the biasing unit 17B always causes a force for swinging the cover portion 13B in the opening direction to act. This force is received by the engaging portion 130 and the engaging portion 20. FIG. 12A shows the engaged state between the engaging portion 130 and the engaging portion 20. The projecting portion 130*a* of the engaging portion 130 engages with the engaging portion 20 by coming into contact with the lower surface 20*a* of the engaging portion 20 in the opening direction of the cover portion 13B, and receives the biasing force of the biasing unit 17B. If the liquid discharge apparatus 1 is used for a long time, the engaging portion 130 or the engaging portion 20 may be deformed due to aging, and the engaging force may lower. Although a measure for increasing the durability of the engaging portion 130 and the engaging portion 20 may be taken, the operation force needed by the user to move the cover portion 13B to the closing position may become large, and the usability may degrade.

Figure 12B:
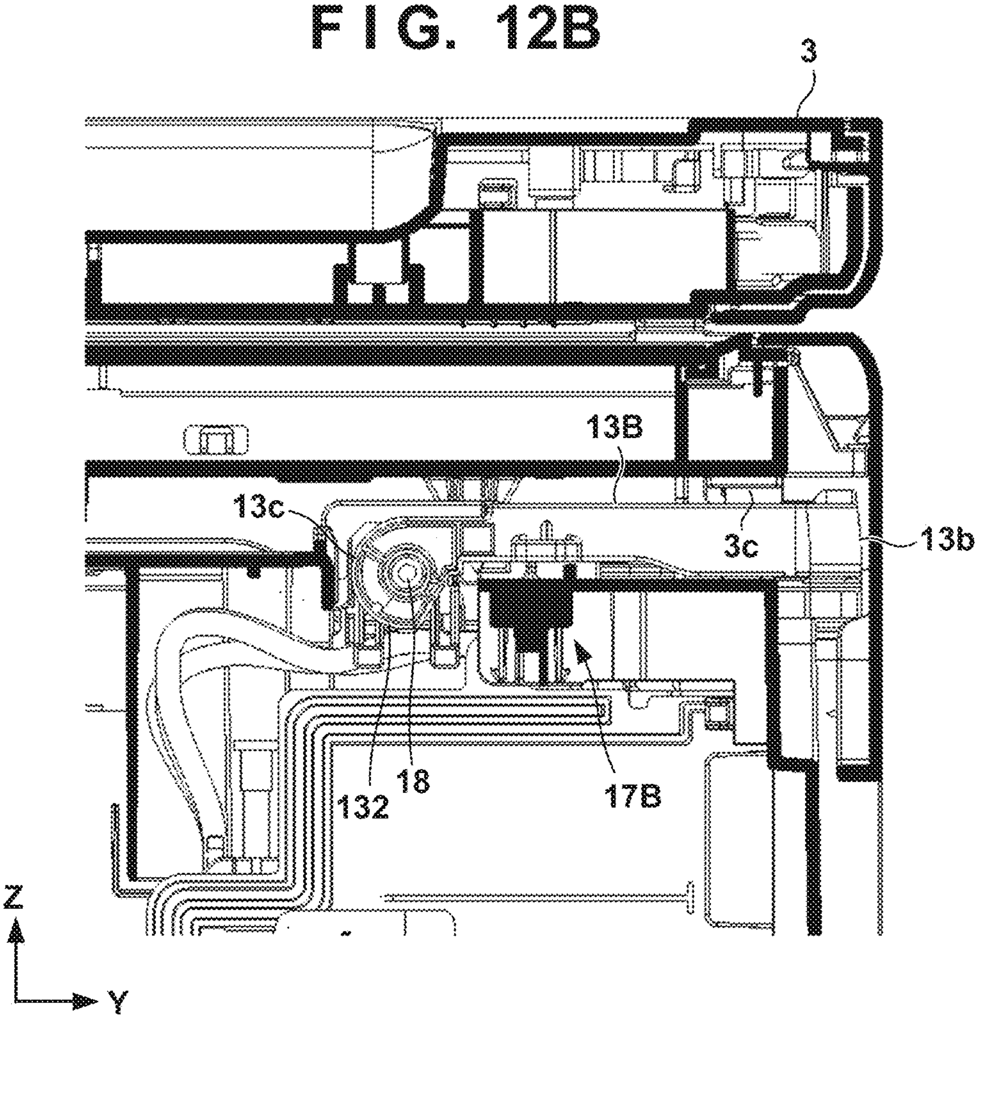
FIG. 12B is a sectional view when the cover portions are moved to the closing positions.

In this embodiment, if the cover portion 3 is located at the closing position, the cover portions 13A and 13B are pressed down, and the engaging portion 130 is separated from the engaging portion 20 a little in the closing direction of the cover portions 13A and 13B. FIG. 12B is an explanatory view for this, and shows the positional relationship between the cover portion 3 at the closing position and the cover portion 13B.

A contact portion 3*c* is provided on the lower surface of the cover portion 3. The contact portion 3*c* is, for example, an elastic member of rubber or the like, or may be formed by a contact member and an elastic member, like the biasing unit 17B. At the closing position of the cover portion 3, the contact portion 3*c* comes into contact with the upper surface of the cover portion 13B to press the cover portion 13B to the swing limit position on the closing direction side. Accordingly, the projecting portion 130*a* and the lower surface 20*a* are separated from each other, and a gap G is formed between these, as shown in FIG. 8B. Hence, in the state in which the cover portion 3 is located at the closing position, the cover portion 3 bears the biasing force of the biasing unit 17B to prevent the engaging force from acting on the engaging portion 130 and the engaging portion 20. As a result, lowering of the engaging force between the engaging portion 130 and the engaging portion 20 caused by aging can be prevented.

Figure 13B:
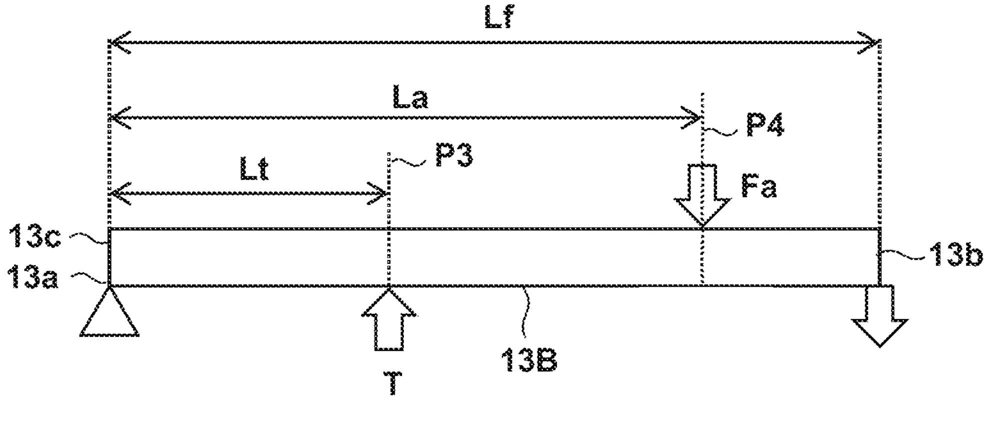

FIG. 13B is a view showing the balance relationship of forces acting on the cover portion 13B in a case in which the cover portion 3 is located at the closing position. Let La be the distance from the swing center 13*a* of the cover portion 13B to a pressing position P4 by the contact portion 3*c*, and Fa be the pressing force. These are configured to hold $La \times Fa > Lt \times T$. That is, a moment for closing the cover portion 13B by the contact portion 3*c* is made larger than a moment for opening the cover portion 13B by the biasing unit 17B.

If the user leaves the cover portion 3 at the opening position, a warning can be generated to the user. For example, if the cover detection sensor 35*a* detects continuously for a predetermined time that the cover portion 3 is not located at the closing position, a display for promoting the user to move the cover portion 3 to the closing position is done on the operation unit 36.

Second Embodiment

Figure 14A:
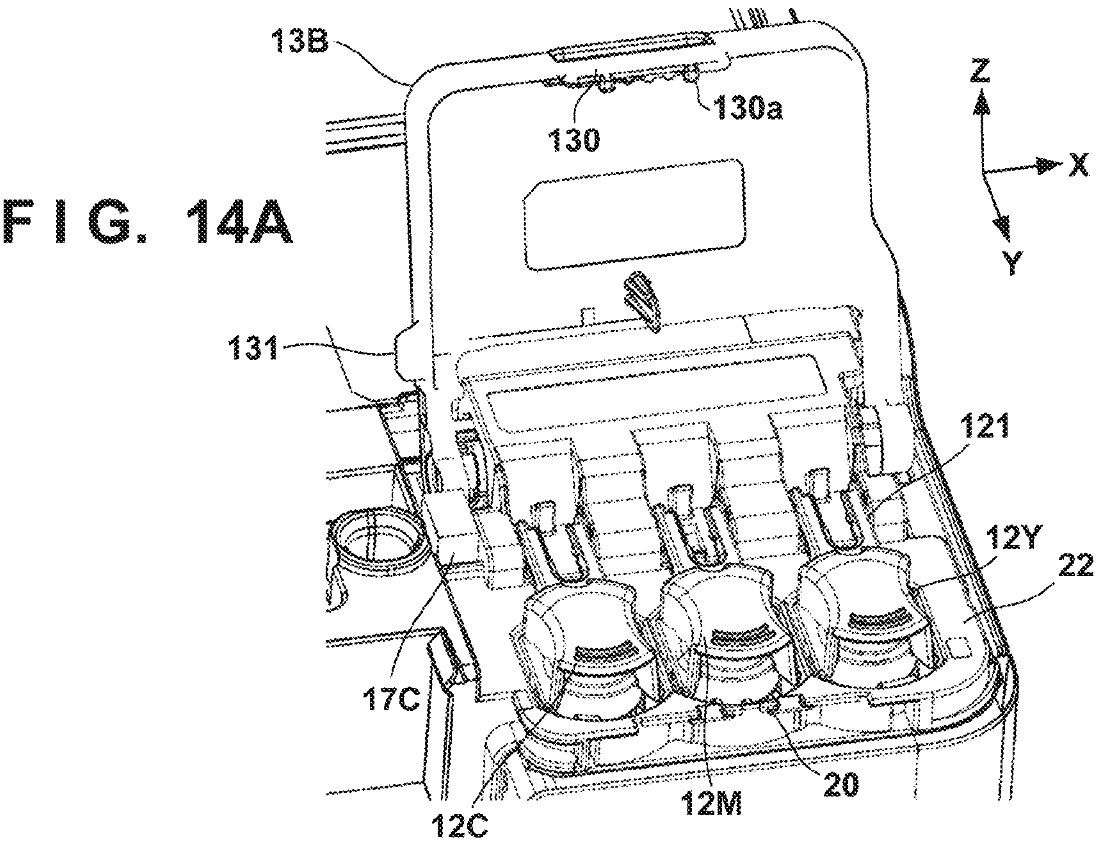
FIGS. 14A and 14B are explanatory views of other biasing units.
Figure 14B:
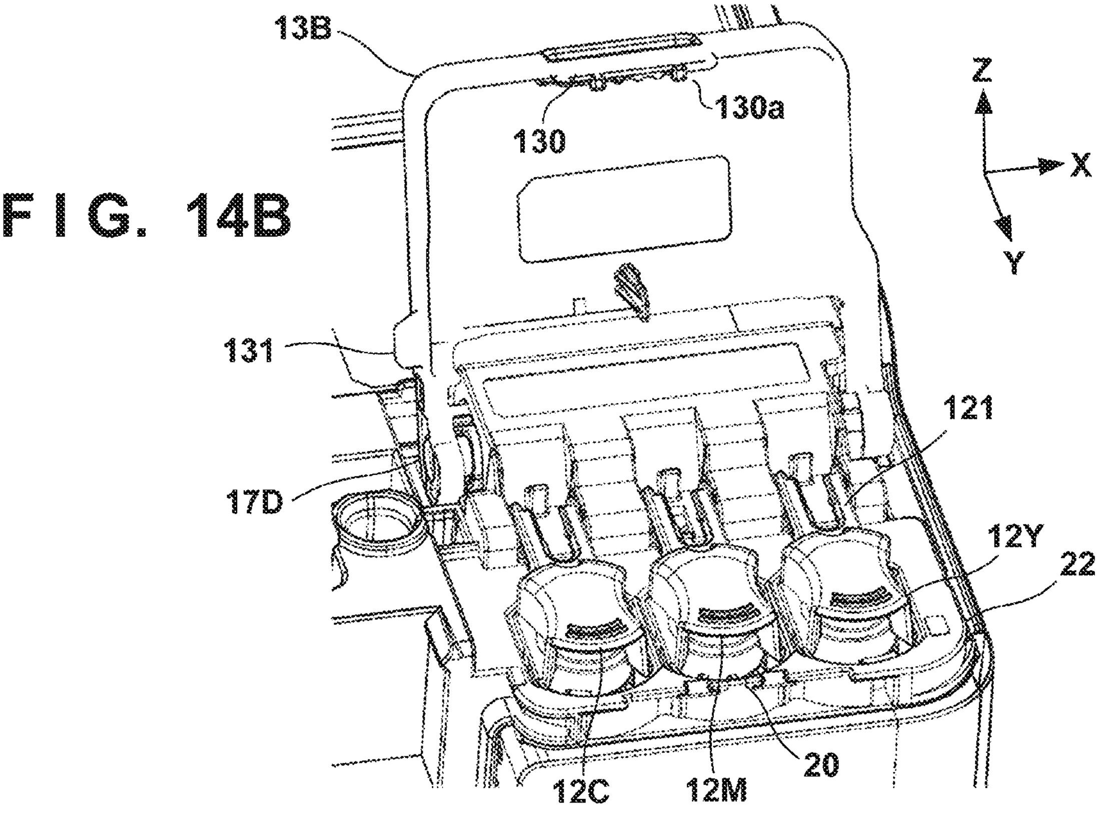

In the first embodiment, as an example of the biasing units 17A and 17B, a configuration example including the contact member 170 and the elastic member 171 has been described. However, the present invention is not limited to this. FIGS. 14A and 14B show other examples of biasing units. In the example shown in FIG. 14A, a biasing unit 17C is formed by only an elastic member of rubber or the like, which is arranged to be able to contact a contact piece 131. In the example shown in FIG. 14B, a biasing unit 17D is a torsion coil spring provided on a shaft portion 18 that defines a swing center 13*a* of a cover portion 13B. The biasing unit 17D provides a biasing force for swinging the cover portion 13B in the opening direction.

Third Embodiment

Figure 15A:
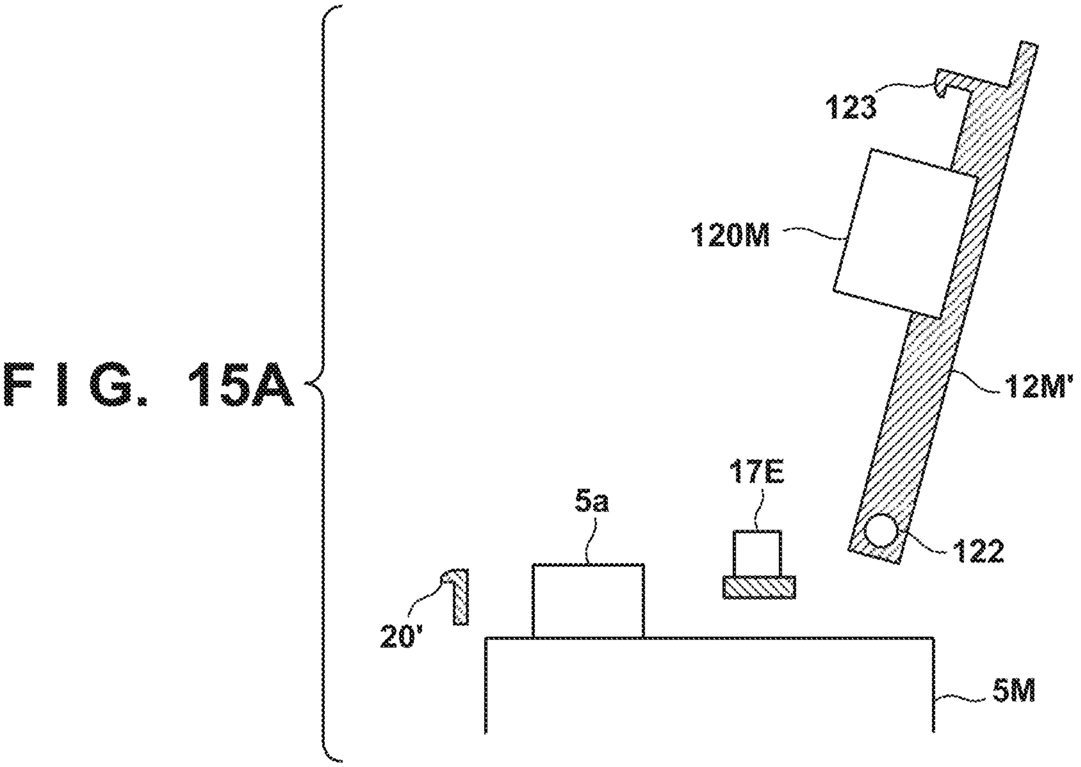
FIGS. 15A to 15C are views showing an example in which a biasing unit is provided in a cap member.
Figure 15B:
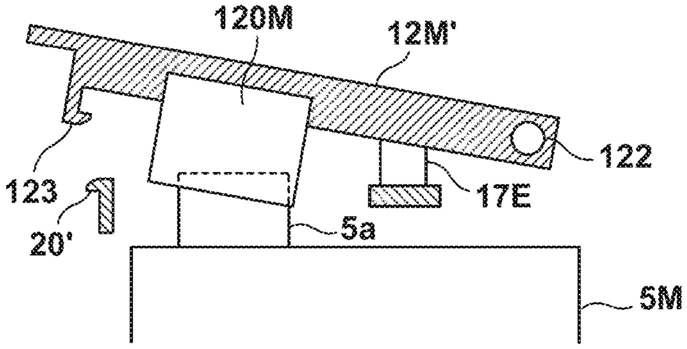
Figure 15C:
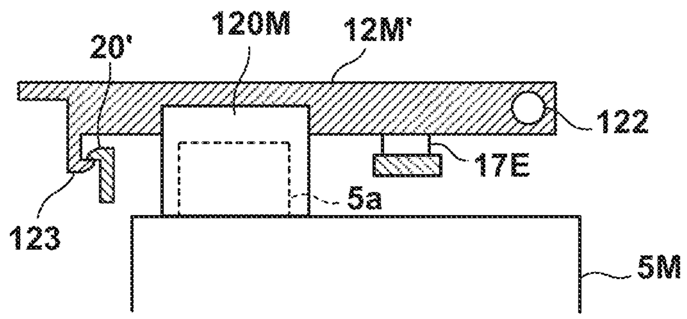

In the first embodiment, a configuration example in which the cover portions 13A and 13B are popped up by the biasing units 17A and 17B has been described. However, another member to be opened/closed may be provided with a biasing unit and popped up. FIGS. 15A to 15C show an example in which a cap member is biased by a biasing unit.

In the illustrated example, a cap member 12M' corresponding to a container 5M is popped up by a biasing unit 17E. This also applies to cap members corresponding to containers 5Bk, 5C, and 5Y In this embodiment, the biasing unit 17E is an elastic member of rubber or the like. The configuration of the cap member 12M' is basically the same as the configuration of the cap member 12M described above. The cap member 12M' includes a cap portion 120M capable of closing an inlet portion 5*a*, and is swingably supported on a shaft portion 122. An engaging portion 123 is provided at the distal end portion of the cap member 12M'. By engaging with an engaging portion 20' on the apparatus side, the engaging portion 123 regulates the movement of the cap member 12M' from the closing position to the opening position and maintains the cap member 12M' at the closing position.

FIG. 15A shows a state in which the cap member 12M' is located at the opening position. The biasing unit 17E and the cap member 12M' are spaced apart. FIG. 15B shows a state halfway through the movement of the cap member 12M' from the opening position to the closing position. The biasing unit 17E comes into contact with the cap member 12M', and the cap member 12M' is biased in the opening direction by the biasing unit 17E. FIG. 15C shows a state in which the cap member 12M' further swings and reaches the closing position, and the engaging portion 123 engages with the engaging portion 20'. The biasing unit 17E is in a compressed state.

Assume that the user moves the cap member 12M' to the closing position, and the engagement between the engaging portion 123 and the engaging portion 20' is insufficient. In this case, when the user releases the hand, the cap member 12M' is biased by the biasing unit 17E and pops up, as shown in FIG. 15B. Hence, the user visually recognizes that the cap member 12M' is not moved to the closing position. As a result, the user moves the cap member 12M' to the closing position again and reliably engages the engaging portion 123 with the engaging portion 20'. Hence, in this embodiment, it is possible to prevent forgetting of closing of the cap member 12M' and guide the user to operate the cap member 12M' to the closing position.

In this embodiment, cover portions 13A and 13B may be omitted. As described with reference to FIG. 12B, when a cover portion 3 is moved to the closing position, the cap member may be pressed downward by the cover portion 3.

OTHER EMBODIMENTS

In the above-described embodiment, a configuration example in which the cover portion 3 includes the reading unit (scanner unit) 3*a* has been described. However, the cover portion 3 may not have such a reading function, as represented by the access cover of an SFP (Single Function Printer), or the like. In the above-described embodiment, a configuration example in which all the cover portions 3, 13A, and 13B are moved by swing has been described. However, these may be moved by translation between the opening position and the closing position. In the above-described embodiment, the cover portion 13B common to the containers 5C to 5Y is used. However, the containers may be provided with individual cover portions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-021061, filed Feb. 12, 2021, which is hereby incorporated by reference herein in its entirety.

What is claimed is:

1. A printing apparatus comprising:
- a conveying roller configured to convey a print medium in a first direction;
- a container configured to contain ink to be supplied to a discharge head, the container including an inlet through which the ink is injected;
- a cap member including a cap portion configured to cap the inlet, and configured to be swingably supported with a shaft portion provided upstream of the inlet with respect to the first direction, the cap member being movable between a closing position where the cap portion caps the inlet and an opening position where the cap portion does not cap the inlet;
- a biasing unit configured to bias the cap member toward the opening position and away from the inlet; and
- an engaging portion configured to engage with the cap member to prevent the movement of the cap member from the closing position to the opening position when engaged and to allow the movement of the cap member from the closing position to the opening position when disengaged.

2. The printing apparatus according to claim 1, wherein the biasing unit includes a rubber member.

3. The printing apparatus according to claim 1, wherein the biasing unit includes a coil spring.

4. The printing apparatus according to claim 1, wherein the engaging portion is provided downstream of the inlet in the first direction.

5. The printing apparatus according to claim 1, further comprising:
- a first cover configured to cover the cap member, the first cover being movable between a closing position where the cap member is covered and an opening position where the cap member is not covered.

6. The printing apparatus according to claim 5, wherein a movement direction of the first cover from the closing position to the opening position and a movement direction of the cap member from the closing position to the opening position are the same.

7. The printing apparatus according to claim 5, further comprising:

a second cover configured to cover the first cover, the second cover being movable between a closing position where the first cover is covered and an opening position where the first cover is not covered.

8. The printing apparatus according to claim 7, wherein a movement direction of the second cover from the closing position to the opening position and a movement direction of the cap member from the closing position to the opening position are the same.

9. The printing apparatus according to claim 7, wherein a movement direction of the second cover from the closing position to the opening position and a movement direction of the first cover from the closing position to the opening position are the same.

10. The printing apparatus according to claim 7, wherein the second cover includes a reading unit configured to read an image of a document.

11. The printing apparatus according to claim 7, wherein the second cover covers the discharge head.

12. The printing apparatus according to claim 7, wherein the second cover covers the conveying roller.

13. The printing apparatus according to claim 1, further comprising a carriage configured to carry the discharge head in a second direction crossing the first direction.

14. The printing apparatus according to claim 13, further comprising a second container configured to contain second ink to be supplied to the discharge head, wherein the container and the second container are arrayed in the second direction.

15. The printing apparatus according to claim 14, further comprising a discharge portion to which a print medium printed by the discharge head is discharged.

16. The printing apparatus according to claim 15, wherein the discharge portion is provided between the container and the second container in the second direction.

17. The printing apparatus according to claim 14, wherein the container contains color ink and the second container contains black ink.

18. The printing apparatus according to claim 1, further comprising a tube portion provided in the inlet, wherein a bottle is insertable into the inlet, and ink in the bottle is injectable into the container through the tube portion in the inlet.

19. The printing apparatus according to claim 18, wherein the engaging portion is separated from the tube portion.

20. The printing apparatus according to claim 1, wherein the cap member includes a second engaging portion configured to engage with the engaging portion.

21. The printing apparatus according to claim 1, wherein the engaging portion is configured to engage with the cap member so as to maintain the cap member in the closing position against a bias of the biasing unit.

* * * * *